Sept. 23, 1924.
C. H. RICHARDS
LUBRICANT FEED
Filed June 15, 1922
1,509,487
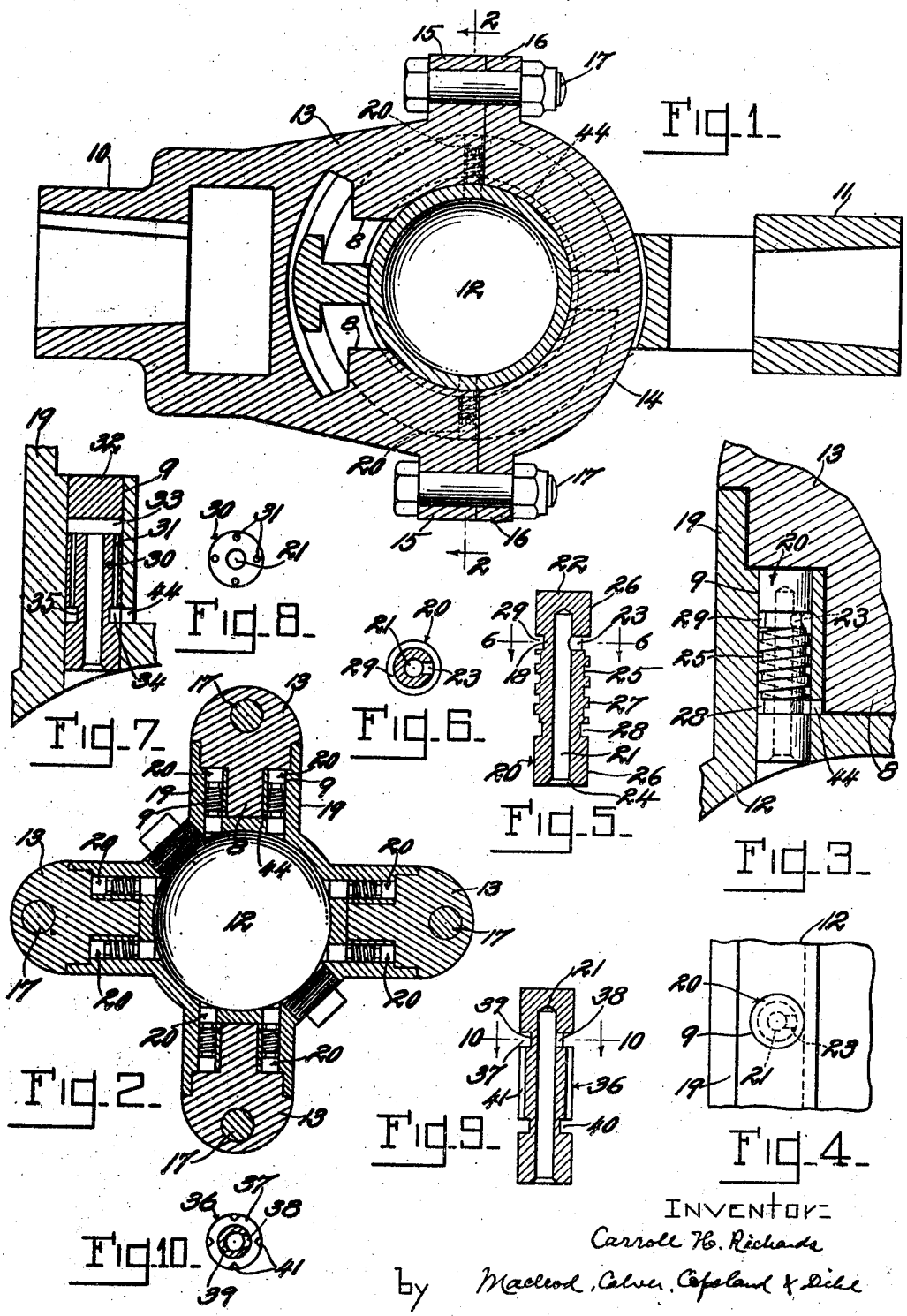

Patented Sept. 23, 1924.

1,509,487

UNITED STATES PATENT OFFICE.

CARROLL H. RICHARDS, OF NEWTON, MASSACHUSETTS.

LUBRICANT FEED.

Application filed June 15, 1922. Serial No. 568,488.

*To all whom it may concern:*

Be it known that I, CARROLL H. RICHARDS, a citizen of the United States, residing at Newton, county of Middlesex, State of Massachusetts, have invented a certain new and useful Improvement in Lubricant Feed, of which the following is a specification, reference being had therein to the accompanying drawings.

The invention relates to a new and useful improvement in lubricant feed. It relates especially to a lubricant feed for that class of universal joints which are employed to connect two shafts and in which the joint comprises two coupling elements and a hollow lubricant holder intermediate the two coupling elements. The present invention is an improvement on the device shown and described in my prior applications, Serial No. 391,500, filed June 24, 1920, and Serial No. 423,760, filed November 12, 1920. The present invention relates more particularly to the lubricant feed and is an improvement on the lubricant feed shown and described in said prior applications. The lubricant feed shown and described in said prior applications was more particularly adapted for use where the lubricant employed is oil and the lubricant feed employed wicks. The use of wicks, however, is not well adapted for use with a harder or viscous lubricant, such for instance, as grease, because in order to use grease with a wick feed the grease has to be in some way heated to a higher temperature before it will flow, it being necessary to practically melt the entire body of grease before it will begin to flow and to do this the entire container or ball which constitutes the intermediate lubricant container has to be heated, which is objectionable, this heating usually being accomplished by friction.

Oil as a lubricant has the disadvantage that it flows too freely in a hot temperature and is thrown out. This is especially true in hot weather of the summer when the oil frequently flies out. On this account grease is preferable as it will work at all temperatures if a proper feed is employed, as in my invention. It will feed in winter sufficiently to lubricate the bearings and yet it will not throw out in hot weather.

By using the harder form of lubricant, that is, a lubricant with higher viscosity than oil, such for instance as grease, the lubricant is held longer and does not require replacement as quickly as when oil is used, taking into account all temperatures.

The object of my invention is to provide a feed adapted for use with grease or other lubricant harder or of greater viscosity than oil and to provide such a construction of the feed that the grease will be sufficiently heated by the friction so that it will feed without heating the entire ball, that is, the lubricant container, and yet will be controlled in such a manner as to check a too free feed.

One feature of the invention consists in causing the lubricant to first be driven out of the container by centrifugal force and change the direction of flow on its way to the bearing surfaces, so that after it passes the turn in the passage it will flow toward the center of rotation and the centrifugal force due to the rotation and its own weight will retard the flow.

The invention will be fully understood from the following description when taken in connection with the accompanying drawings, and the novel features thereof will be pointed out and clearly defined in the claims at the close of this specification.

In the drawings, Fig. 1 is a sectional view of a universal joint embodying the invention.

Fig. 2 is a section on line 2—2 of Fig. 1.

Fig. 3 is a detail sectional view showing the lubricant feed member installed in the ball member of the joint.

Fig. 4 is a plan view of the lubricant feed member mounted in the ball joint as shown in Fig. 3.

Fig. 5 is a detail view of the feed member.

Fig. 6 is a section on line 6—6 of Fig. 5.

Fig. 7 is a detail sectional view similar to Fig. 3 but showing a modified form of feed member installed in the ball member of the joint.

Fig. 8 is a plan view of the feed member shown in Fig. 7.

Fig. 9 is a detail view of another modified form of feed member.

Fig. 10 is a section on line 10—10 of Fig. 9.

Referring now to the drawings, 10 and 11 represent the shanks of two bifurcated coupling elements and 12 represents a spherical or ball lubricant holder with which said bifurcated elements are connected. Each of the two shank members 10—11 is constructed for engagement with contiguous ends of two shafts, not shown, which are to be connected together by the joint.

The two coupling elements 10—11 are duplicates of each other and are connected in like manner with the hollow sphere or ball 12, but the jaws of the coupling element lie in a plane at an angle of 90° from the plane in which the jaws of the other coupling element lie.

The coupling elements 10 and 11 are each formed with two similar jaws 13—13, each having an inner periphery on the arc of a circle, and the outer ends of said two jaws 13—13 are connected by a semi-circular strap 14 whose inner periphery combines with the inner periphery of the two jaws 13—13 to encircle the ball 12. The jaws 13—13 are formed respectively with lugs 15—15 at their outer ends and the strap 14 is formed with lugs 16—16 at its ends, whose faces engage the faces of the lugs 15—15 respectively. The strap is detachably connected with the jaws by bolts 17 which pass through the lugs of the jaws and straps.

The combined jaws and strap have a tongue and groove connection with the ball 12 by a sliding fit. The preferred form is to provide the ball with grooves and to provide the jaws and strap with tongues.

In the form shown in the drawings, the jaws 13 are each formed with tongues 8 on the arc of a circle concentric with the periphery of the ball, and the ball is formed with parallel peripheral flanges 19—19 forming between them a groove within which the tongues 8 have a sliding fit.

The ball is formed with a plurality of apertures 9 which extend through the periphery of the ball and through the ribs or flanges 19—19.

In each of the apertures 9 is inserted one of the lubricant feed members 20, which I term a cartridge. In the preferred form this cartridge as shown in detail in Figure 5 comprises a cylindrical member or plug which is adapted to fit tightly in one of the apertures 9 and is formed with a passage 21 which extends from the inner end of the cartridge longitudinally toward the other end, but said opposite end 22 is closed. A passage or port 23 leads from the longitudinal passage 21 laterally through the side wall of the neck 18 of the cartridge formed by the annular groove 29. Preferably the entrance to the passage 21 is chamfered or made flaring, as shown at 24, to afford a free entrance of the lubricant from the container into the open end of the cartridge.

The outer periphery of the cartridge is formed with a spiral groove 25 which extends from the lateral port 23 back toward the inner end of the cartridge to form an outside return passage for the lubricant, as will be hereinafter described. The cartridge is formed with a smooth outer periphery 26 near both ends so as to make a close joint with the aperture 9 in which it is fitted.

When the cartridges are fitted into the apertures 9 as shown in Figures 1, 2, and 3, the inner end of the cartridge projects through the periphery of the ball container 12 and the entrance end 24 of the passage 21 is open to the interior of the lubricant container 12. The two head portions of the cartridge which have the smooth outer peripheral portions 26—26 fit snugly within the apertures 9 so as to make a tight joint; also the spiral rib 27 which is formed by the spiral groove 25 is of the same diameter as the head portions 26 so that this spiral rib also fits snugly within the aperture 9 and there is thus formed a spiral backward passage between the cartridge and the wall of the aperture 9 in which the cartridge is fitted, this spiral passage extending from the lateral outlet port 23 down to the annular groove 28 at the opposite end of the spiral. This annular groove 28 communicates through an annular groove 44 in the flange 19 of the ball 12, with the thin crevice between the movable bearing surfaces formed by the peripheral flanges 19 of the lubricant container and the jaws 13.

The chamber of the ball container 12 is supposed to be filled with grease, and when the engine is in operation so that the shaft and the joint are being rotated the centrifugal force will drive portions of the grease out of the container into and through the passage 21 of the cartridge, the friction of the rubbing bearing surfaces of the joint being sufficient to generate heat enough to partially melt the grease when it reaches the outlet aperture 23; thence it will pass through the outlet aperture 23 into the spiral groove 25 in the outer periphery of the cartridge. There is a tight joint between the outer periphery 26 of the outer end portion of the cartridge and the wall of the aperture 9 into which it is fitted, so that the grease cannot be forced radially outward further and it must go back toward the center following the only path that is open to it, namely, the spiral passage 25. In following this backward path toward the center through the spiral groove 25 it is moving counter to the centrifugal force but it is forced in this direction by the pressure of the grease behind it in the passage 21. On the other hand the circuitous passage through the spiral groove causes a check or retarding effect on the pressure from the grease behind it in the passage 21. Thus there is a double retarding action or check tending to offset the centrifugal force outward, namely the check due to the spiral passage and the obstruction of the rib 27, and the fact that in making the passage through the spiral groove it is moving counter to the centrifugal force. In this way not only is the lubricant caused to move under less force than if it were driven in a straight, outwardly, radial direction, but also the skin friction tends to retard it. When the grease reaches the annular groove 28 it will pass from there into the annular groove 44 and thence between the bearing surfaces, as already stated.

In the modified form shown in Figures 7 and 8, instead of forming a spiral groove on the outside of the cartridge and an outlet port leading from the interior passage 21 to said spiral groove, the cartridge member 30 is formed with a plurality of longitudinal apertures 31 in the wall of the cartridge which extend from the outer end of the member 30 back to the annular groove 34 which connects with the groove 44 in the flange of the ball member. A plug 32 is inserted in the outer end of the aperture 9 so as to close the aperture 9 at its outer end. This plug, however, does not extend entirely down to the end of the cartridge member 30 but leaves an open space 33 between the plug 32 and the outer end of the member 30. Thus when the grease is forced radially outward through the passage 21 it is driven into the chamber 33 and thence is forced by the pressure of the grease behind it, due to the centrifugal force in driving it out, to go backward through the small passages 31 until it passes out into the annular groove 34 formed by the neck 35 of the cartridge, and thence out through the annular groove 44 in the flange of the ball 12 which communicates therewith, whence it passes up between the bearing surfaces, as already described. This is a somewhat simpler form of construction than the first described form of construction containing the spiral groove. The plug 32 serves the purpose of the head 22 of the first form and the space 33 between the plug 32 and the end of the member 30 serves in place of the annular groove 29 and port 23.

In the modification shown in Figures 9 and 10, the cartridge 36 is formed with an annular groove 37 near its outer end and with a port 38 leading laterally from the central passage 21 through the neck 39 into the said groove 37. The cartridge is also formed with an annular groove 40 near the inner end which communicates with the annular groove 44 in the flange of the ball member, and the body of the cartridge between the two annular grooves 37 and 40 is formed with longitudinal grooves 41 in its outer periphery which connect the two annular grooves 37 and 40.

When the lubricant is forced radially outward through the passage 21 it passes laterally out through the port 38 in the neck 39 into the annular groove 37, and thence it is caused to pass backward through the longitudinal grooves 41 to the annular groove 40, thence into the annular groove 44 to the bearing surfaces.

While the invention is especially intended for use with universal joints and has been particularly described in connection with a universal joint, it is intended herein to have the claims cover broadly the application of said invention to any rotatable body to which it is adapted.

What I claim is:

1. In combination with a rotatable member having a bearing surface and formed with a hollow interior to contain lubricant, the wall of the said container being formed with an aperture therethrough, a feed member inserted in said aperture, said feed member having a longitudinal interior passage which at the inner end thereof communicates with the hollow interior of the container, said feed member having a passage on the outer side thereof, one end of which communicates with the outer end of said interior passage, the other end of said outside passage communicating with the bearing surface.

2. A universal joint having a lubricant container, and a coupling element having a flexible connection therewith, said container being formed with an aperture through the wall of the chamber containing the lubricant, and a lubricant feed member inserted in said aperture and extending outwardly, said feed member consisting of a cartridge having a longitudinal passage which at the inner end thereof opens into the chamber of the container and extends longitudinally outward for some distance to form an outlet for the lubricant, and thence opens into another passage which leads backward and communicates with the interengaging surfaces of the members of the joint.

3. In combination with a rotatable member having bearing surfaces, a lubricant container, said container being formed with an aperture through the wall of the chamber containing the lubricant, and a lubricant feed member inserted in said aperture and extending outwardly, said feed member consisting of a cartridge having a longitudinal passage which at the inner end thereof opens into the chamber of the container and extends longitudinally outward for some distance to form an outlet for the lubricant, and thence opens into another passage which leads backward and communicates with the interengaging surfaces of the members of the joint.

4. A universal joint having two coupling elements, an intermediate lubricant containing member having flexible engagement therewith, said coupling members and lubricant holder having interengaging portions which have rubbing engagement with each other, said container being formed with apertures through the wall thereof, and lubricant feed passages which lead outwardly from said apertures in the container and into which the lubricant is driven by centrifugal force when the joint is rotated, said feed passages communicating with a return passage which leads to the bearing surfaces of the interengaging portions of said members, so formed and arranged that the lubricant in passing through the return passage moves in a direction counter to the action of the centrifugal force.

5. A universal joint having a lubricant container and a coupling element having a flexible connection therewith, said container being formed with an aperture through the wall of the chamber containing the lubricant, and a lubricant feed member inserted in said aperture and extending outwardly, said feed member consisting of a cartridge having a longitudinal interior passage which at the inner end thereof opens into the chamber of the container and extends longitudinally outward to form an outlet for the lubricant and into which the lubricant may be driven by centrifugal force when the joint is rotated, a reverse passage in the wall of the cartridge having communication at its outer end with the outer end of said outward passage for the lubricant, and a passage leading from the inner end of said reverse passage to the interengaging bearing surfaces of the members of the joint.

6. A universal joint having two coupling elements, an intermediate lubricant containing member having flexible engagement therewith, said container being formed with apertures through the wall thereof, and lubricant feeding members inserted in said apertures, each of said feeding members consisting of a cartridge having a longitudinal interior passage therein, which at its inner end opens into the lubricant chamber of the container to form an outward passage for the lubricant, a plurality of passages in the wall of the cartridge, which at their outer ends have communication with the outer end of said interior passage and form a reverse direction passage for the lubricant, and a lateral passage near the inner end of the cartridge which communicates with said reverse passage and with a passage in the joint which forms a communication between said last lateral passage and the bearing surfaces of the joint.

7. A lubricant feed adapted for use in a universal joint having a lubricant container, said feed comprising a cartridge having a longitudinal interior passage leading from the inner end of the cartridge toward its outer end and adapted to furnish an outlet for the lubricant from the container, an annular groove in the outer periphery of the cartridge near its inner end, a longitudinal passage in the wall of the cartridge communicating at the inner end with said groove, and a port leading from the outer end of the said interior passage to the outer end of the passage in the wall of the cartridge whereby the lubricant is caused to change its course backward.

8. A lubricant feed adapted for use in a universal joint, comprising a cartridge having a longitudinal interior passage leading from the inner end of the cartridge toward the outer end, an annular groove in the outer periphery of the cartridge near its inner end, a plurality of longitudinal passages in the wall of the cartridge communicating at one end with said groove, and a port leading from the outer end of said interior passage to the outer end of said passages in the wall of the cartridge.

9. A lubricant feed adapted for use with a rotatable member, comprising a cartridge having a longitudinal interior passage leading from the inner end of the cartridge toward the outer end, a groove in the outer periphery of the cartridge near its inner end, a longitudinal passage in the wall of the cartridge and communicating at its inner end with said groove, and a port leading from the outer end of said interior passage to said passage in the wall of the cartridge.

10. A lubricant feed adapted for use with a rotatable member comprising a cartridge having a longitudinal interior passage extending from the inner end toward the outer end of the cartridge, a groove in the outer periphery of the cartridge near its inner end, a passage in the wall of the cartridge communicating at one end with said peripheral groove, and a port leading from the outer end of said interior passage to said passage in the wall of the cartridge.

In testimony whereof I affix my signature.

CARROLL H. RICHARDS.